March 5, 1940. H. C. SIMONS 2,192,654
COMPRESSING UNIT
Filed May 14, 1938 2 Sheets-Sheet 1
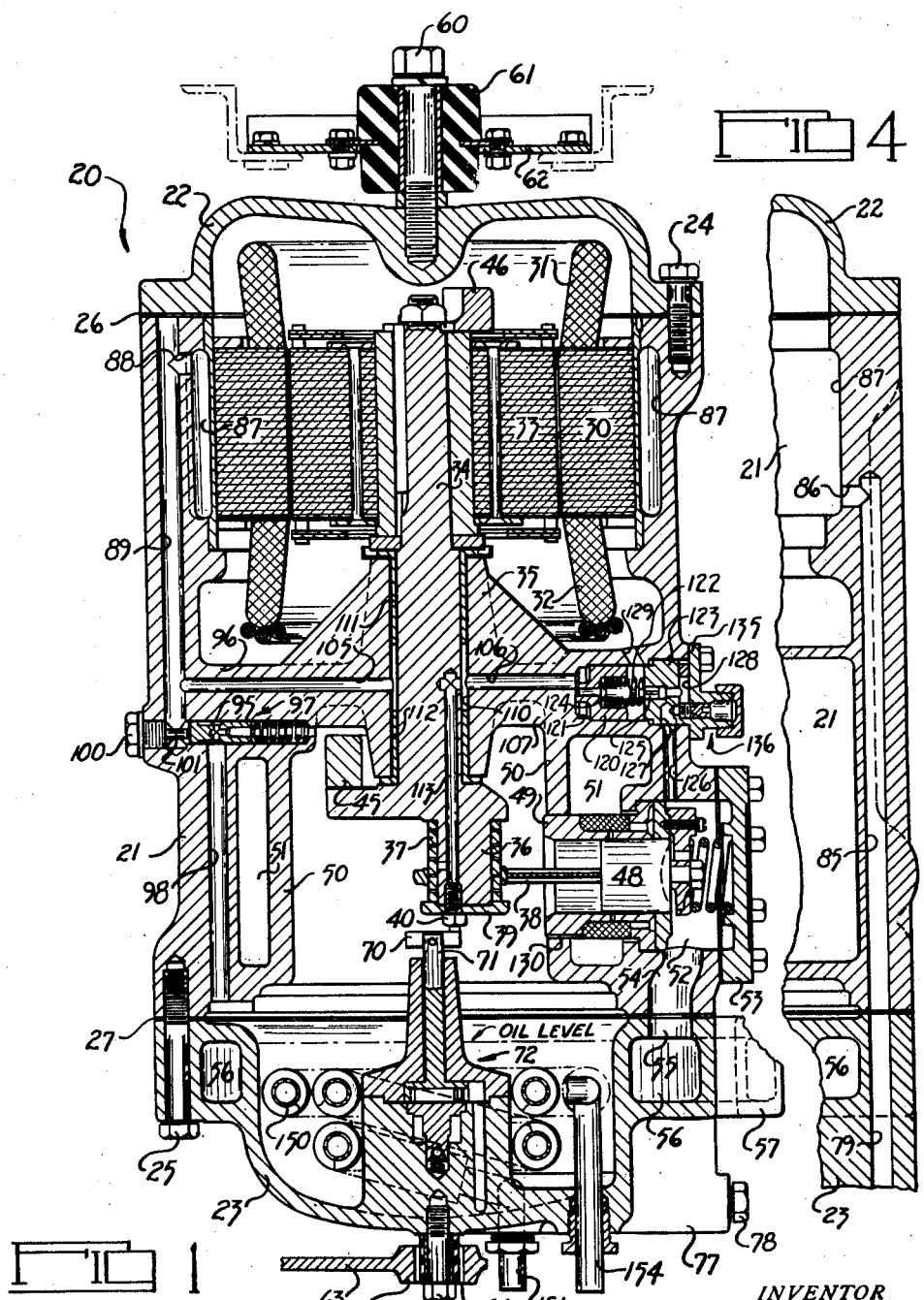
INVENTOR
HOMER C. SIMONS
BY
*Harness, Lind, Patee & Harris*
ATTORNEY March 5, 1940. H. C. SIMONS 2,192,654
COMPRESSING UNIT
Filed May 14, 1938 2 Sheets-Sheet 2
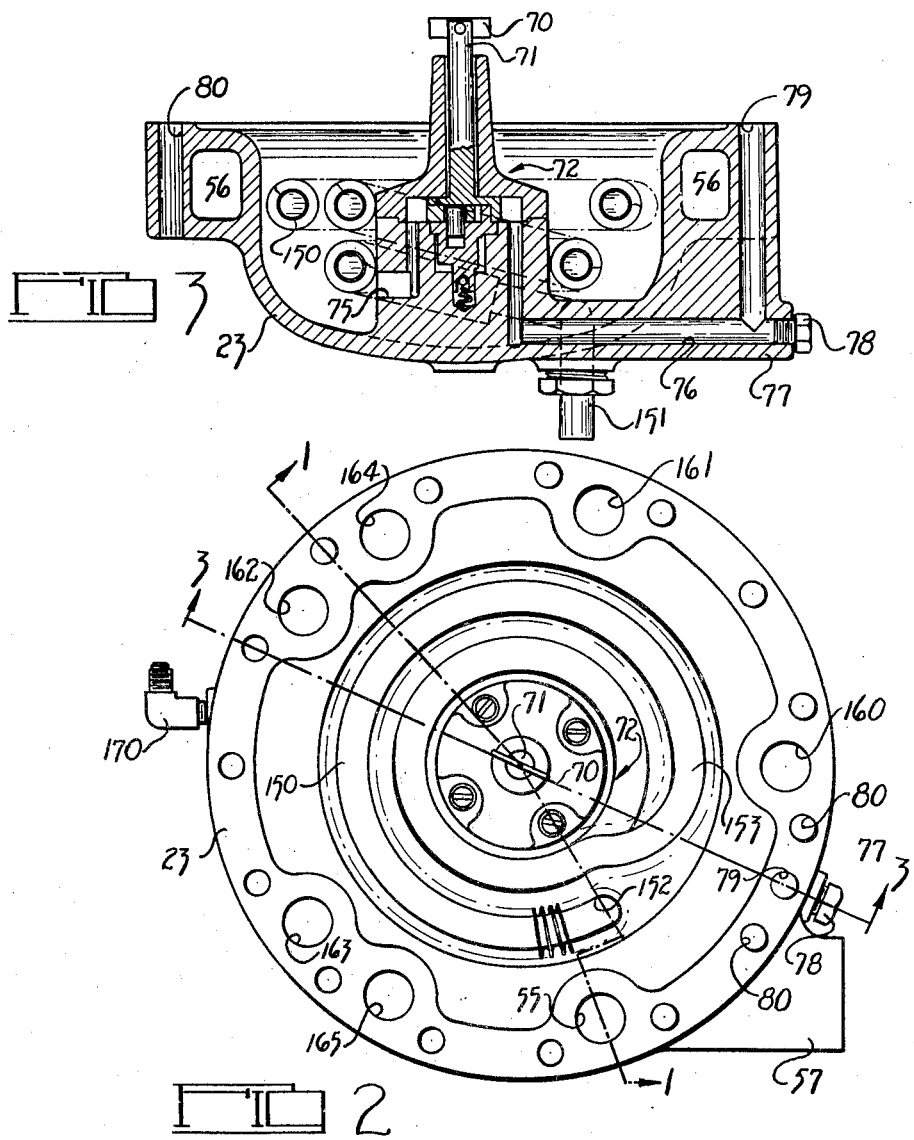
INVENTOR
HOMER C. SIMONS
BY Harness, Dind, Pates & Harris
ATTORNEY Patented Mar. 5, 1940

2,192,654

UNITED STATES PATENT OFFICE 2,192,654

COMPRESSING UNIT

Homer C. Simons, Dayton, Ohio, assignor, by mesne assignments, to Chrysler Corporation, Highland Park, Mich., a corporation of Delaware Application May 14, 1938, Serial No. 207,949

5 Claims. (Cl. 230—206)

My present invention relates to an improvement in compressors, having particular reference to a hermetically-sealed refrigerant compressor having a motor and compressor sealed within a substantially cylindrical housing. Details of such a compressor are described and claimed in the co-pending applications of Charles R. Neeson, Serial Nos. 145,585 to 145,589 inclusive, filed May 29, 1937, and Serial No. 148,974, filed June 18, 1937, of which said application Serial No. 145,589 is now Patent No. 2,137,965, issued November 22, 1938, which applications and patent are assigned to the common assignee of this application.

The foregoing applications set forth a compressor sealed within a housing together with a motor, the rotor of which is attached to one end of the compressor crank shaft, the opposite end of the crank shaft having a crank pin upon which are mounted the bearing straps of a plurality of piston rods. The free end of the crank pin is provided with a projecting, pump-driving pin which engages a crossbar on the shaft of a lubricant circulating pump, which pump circulates a lubricant from the bottom of the compressor through a water-cooled heat exchanger located outside of the compressor, back into the compressor housing into a recess surrounding the stator of the motor whereby to cool the motor, thence into a series of passages leading to a pressure regulating valve which maintains a constant pressure in the lubricating system, an unloading valve which loads or unloads the compressor in response to the creation or release of oil pressure, and into intimate contact with the bearing surfaces of the crank shaft, piston rod straps and other parts of the compressor assembly requiring lubrication. The oil which escapes from the bearing surfaces, or is otherwise released into the interior of the compressor housing, finds its way into the bottom of the compressor housing, which comprises an oil sump from which the oil is again circulated by the pump. Various details of the pump and other heretofore described mechanism will be more clearly apparent from inspection of the aforementioned co-pending applications.

The present invention comprises the inclusion of a finned-surface, oil-cooling tube located within the interior of the compressor housing, the same being located in the bottom of oil sump, beneath the surface of the reserve supply of oil contained therein. Heretofore it has been the practice, as shown in the aforementioned applications, to cause the oil pump to force the oil into a tube extending into a heat exchanger located outside of the compressor housing, this heat exchanger being preferably of the water-tube type having the oil located in a cylindrical chamber surrounding a tube containing water which has previously been utilized to cool the condenser of the refrigerating system and which is now on its way to a disposal system. In this application the same water is utilized but the water is caused to flow through a tube coiled around the oil pump inside of the compressor, thus eliminating additional parts and additional causes of inconvenience or failure of the entire mechanism  In the old practice there was considerable likelihood of leakage occurring due to the number of soldered or welded joints and seams necessary to construct a separate heat exchanger, whereas in the present invention the oil circulating passages are completely contained within the housing of the compressing unit, thus eliminating several possible sources of trouble.

Another object of the present invention is to locate the heat transferring tube in such a position as to be convenient when the compressing unit is contained in an air conditioning structure such as set forth in the co-pending application of Burdell S. Williams, Serial No. 191,304, filed February 18, 1938, now Patent No. 2,116,873. In the Williams' application, the old style of oil cooler is set forth, it being readily ascertainable therefrom that the inlet to the heat exchanger is adjacent the bottom of the cabinet, whereas the outlet of the heat exchanger is adjacent the top of the cabinet, thus requiring expensive, long connections between the heat exchanger outlet and the water disposal system. The present invention is of particular use in a refrigerant condensing unit such as shown in the co-pending application of Bernard W. Jewell, Serial No. 207,955, now Patent No. 2,149,737, filed concurrently herewith, wherein it is clearly seen that the inlet and outlet of the oil-cooling heat exchangers of the present invention are located at substantially the same point in the assembly.

Another object of the present invention is to improve the performance, appearance and operating characteristics of a self-contained compressing unit of the type shown herein by balancing the assembly as a whole, this being achieved by eliminating the added weight of the oil cooling heat exchanger which heretofore has been mounted upon the housing of the compressing unit at one side thereof, thus creating an unbalanced condition, whereas the object of having such a compressing unit is to permit the same to be suspended from a single resilient suspension member so as to be free to oscillate in all directions. With the present invention the weight of the heat exchanger and the thrusting influence of connecting water tubes is more nearly distributed in line with the longitudinal center of the entire unit.

Another object of the present invention is to reduce the number of parts necessary for assembling and servicing a number of compressors of different capacities, by providing a single bottom cover having an oil pump and water cooling tube assembled therein, which bottom cover incorporates a discharge manifold having a plurality of discharge openings therein, some of which discharge openings may register with discharge passages leading from the cylinders of the compressor, and others of which may be blocked off by the lower end of the main compressor shell. By way of example, the present invention is illustrated as comprising a bottom cover having seven discharge openings therein, three of which may register with discharge ports in a three-cylinder compressor shell, or five of which may register with discharge passages in a five-cylinder compressor shell, the remaining openings in either case being suitably blocked by the one gasket having seven openings therein and the solid lower end of the compressor shell.

Other objects and advantages of the present invention will be more fully apparent from a study of the accompanying specification taken in connection with the accompanying drawings wherein like numerals refer to like parts throughout.

In the drawings, Fig. 1 is a vertical section taken substantially along line 1—1 of Fig. 2, looking in the direction of arrows, the view being irregular in some respects since a single plane in vertical section would not show sufficient details to depict the apparatus clearly; Fig. 2 is a plan view of the bottom cover of the compressing unit which forms the oil sump; Fig. 3 is a vertical section taken along line 3—3 of Fig. 2, looking in the direction of the arrows; and Fig. 4 is a vertical section through a part of the housing of the compressing unit including a portion of the bottom cover, the view being taken along line 3—3 of Fig. 2.

Referring to Fig. 1 there is shown a compressing unit 20 comprising a substantially cylindrical shell 21 having a top cover 22 and a bottom cover 23 attached thereto by a plurality of bolts 24 and 25, respectively. A gasket 26 is interposed between the top cover 22 and the top of the shell 21, and a gasket 27 is interposed between the bottom cover 23 and the bottom of the shell 21, the covers, shell and gaskets forming a hermetically-sealed casing within which is mounted the operating parts of the compressing unit. The upper, interior portion of the compressing unit is occupied by a stator 30 comprising extended loops 31 and 32 of stator windings suitably protected by a chloroprene polymer as described in the co-pending application of Charles R. Neeson, Serial No. 145,588, filed May 29, 1937, and a rotor 33 which is fastened to the upper end of a crank shaft 34. The crank shaft 34 is journaled in a bearing support 35 carried by arms cast integrally with the shell 21, and protrudes into the lower portion of the interior of the compressing unit. The lower end of the crank shaft 34 is provided with a crank pin 36 upon which is mounted a bushing 37, which provides the bearing surface for the bearing straps of a plurality of piston rods 38, the bushing 37 and piston rods 38 being retained in position by a crank-pin cap 39 and locking pin 40. The crank shaft is preferably provided with a plurality of counterbalances 45 and 46 as described in the co-pending application of Charles R. Neeson, Serial No. 145,585, filed May 29, 1937. The piston rods 38 operate pistons 48 which reciprocate in cylindrical liners 49 extending through the outer wall of the shell 21 and an inner wall 50 integrally cast therewith which forms a suction manifold 51. Gas which enters the suction manifold is compressed by the piston 48 into a discharge pocket 52 which is closed by a cylinder-head cap 53. The discharged gas passes downward through a discharge passage 54, through the lower end of the shell 21, through a matching opening in the gasket 27, through a discharge opening 55 in the top surface of the bottom cover 23, and into a discharge manifold 56 extending circumferentially of the oil sump space within the bottom cover 23. The compressor usually has a number of cylinders compressing gas through a number of passages 54, all of which communicate with the discharge manifold 56 which leads the gas into a discharge head 57 communicating with the remainder of the refrigerating system. Details of the piston, cylinder liner and valve assembly, and other portions of the aforementioned apparatus, may be found in the co-pending applications of Charles R. Neeson, Serial No. 145,589, filed May 29, 1937, now Patent No. 2,137,965, and Serial No. 148,974, filed June 18, 1937.

The compressor is preferably mounted by suspending the same by means of a bolt 60 fastened into the top of the top cover 22 and having its head supported by a resilient block 61 carried by a mounting plate 62 as described in the co-pending application of Charles R. Neeson, Serial No. 145,585, filed May 29, 1937. The resilient block 61 permits partial rotation, vibration and oscillation of the compressing unit in all directions, some of which movements may be restrained by a bracing arm 63 extending from some supporting structure (not shown), the end of which is provided with a head 64 through which passes a bolt 65 extending from the bottom cover. The bolt is preferably provided with an encircling collar 66 made of resilient material and which is of considerably lesser diameter than the internal diameter of the opening in head 64.

The locking pin 40 engages a crossbar 70 on the upper end of a pump shaft 71 which drives a pump 72 mounted in a housing extending upwardly from the bottom of the bottom cover 23. The pump is submerged in the oil contained within the bottom cover and operates to force the oil from the bottom cover through a motor cooling and compressing unit lubricating system. Details of the pump and of the lubricating system may be found in the co-pending application of Charles R. Neeson, Serial No. 145,586, filed May 29, 1937. The lubrication system in the present invention differs materially from that shown in the aforesaid application since the entire system is contained within the compressing unit itself. Referring to Fig. 3, it is seen that the pump 72 withdraws oil from the sump through an inlet opening 75, and discharges the oil through an outlet 76 extending horizontally through a boss 77 built out from the side of the oil sump. In the present instance, the end of passage 76 is closed by a plug 78 and the oil passes vertically upward through a bore 79 extending to the upper surface of the cover 23.

The bore 79 is suitably spaced between two of the holes 80 through which the bolts 25 pass into the lower end of the shell 21. The bore 79 communicates with a vertically extending bore 85 which passes upward through the wall of the shell 21 into proximity with the rotor 30, where it is joined by a short crossbore 86 leading into a recess 87 completely surrounding the shell of the stator 30. The oil circulates through the recess 87, carrying the heat away from the motor and thereby maintaining the motor at a substantially constant and efficient operating temperature. The heated oil leaves the recess 87 through a crossbore 88 extending into a vertically drilled bore 89 which passes downward through the wall of shell 21 to a point opposite the bearing support 35. A crossbore 95, extending through arm 96, which is one of the arms supporting the bearing housing 35, joins bore 89 and houses an oil pressure relief valve 97 which, as explained in the co-pending application of Charles R. Neeson, Serial No. 145,587, filed May 29, 1937, maintains the oil pressure at a constant value and permits the relief of excess oil through a vertically extending bore 98 in the wall of shell 21 which terminates at a point slightly above the oil in the oil sump and slightly above the upper surface of the discharge manifold 56 so that oil returned through bore 98 joins the oil in the oil sump without material splashing or foaming. The crossbore 95 is closed by a plug 100 which is provided with an inwardly extending pin 101 which acts to limit the movement of the relief valve 97.

The oil which is to be used for lubrication travels through a second crossbore 105 extending inwardly through arm 96 from bore 89. Bore 105 is drilled into bore 89 from the opposite side of the shell, the bore being in line with a crossbore 106 extending through bearing supporting arm 107. Oil passing inward through crossbore 105 enters a space 110 surrounding the shaft 34, and thence lubricates the bearings 111 and 112. Some of the oil finds its way through a bore 113 and connecting passageways leading to the inner surface of the bushing 37 and openings through the bushing 37 into lubricating contact with the bearing straps of piston rods 38.

The oil exerts a pressure on a compressor loading piston 120 housed within a valve pocket 121 communicating with crossbore 106, the valve pocket 121 being located within a boss on arm 107. The piston 120 is normally retained in the position shown by a spring 122 which rests against a gas relief valve plate 123 mounted in pocket 121. When the compressing unit is operating at normal speed, the pump 72 creates sufficient pressure to move the loading piston 120 toward the right against the force of spring 122 a sufficient distance to cause an attached plunger 124 to close a gas relief valve 125 in plate 123. When the compressor is not operating, the gas relief valve 125 is forced to the illustrated open position by gas pressure so that gas compressed by all of the pistons 48 may choose the path of least resistance and flow from discharge manifold 56, through the discharge pocket 52 shown in the drawings, through a connecting bore 126 into a bore 127 in the valve plate 123, into a relief pocket 128, through the open valve 125 and back into the compressor interior by way of a hole 129 extending through the side of arm 107. The gas then returns into the suction manifold 51 by way of grooves 130 in the cylinder liners 49.

From the foregoing it can be appreciated that the compressor is unloaded when the pump is operating at a speed lower than the speed necessary to create sufficient force to overcome the spring 122, and that thereafter the compressor is loaded by reason of the valve 125 being closed. When the current to the motor is discontinued, the pump ceases to create sufficient oil pressure with the result that spring 122 causes piston 120 to return to the position shown, and the pressure of the gas in the discharge manifold causes the valve 125 to open, at which position it will remain until piston 120 is again moved to the right. The motor is thus permitted to start under a minimum load, thereby permitting the use of a smaller motor of the low-torque, normal-starting-current type.

The valve plate 123, valve 125 and piston 120 are inserted through the open end of pocket 121 and are held in position by a cover plate 135 which is provided with a test valve fitting 136 by means of which internal pressures of the compressor may be ascertained.

As shown in the concurrently filed application of Bernard W. Jewell, Serial No. 207,955, now Patent No. 2,149,737, water for the purpose of cooling the oil in the oil sump is admitted and ejected through the wall of the bottom cover 23. The water is admitted into the end 151 of a finned tube 150, the end 151 adjoining a vertically extending shank which passes through a packing gland in the bottom cover 23. Closely adjacent the inner surface of the bottom cover the tube is bent substantially horizontally to form a loop or convolution closely adjacent the housing of the oil pump 72 and just above the bottom of the oil sump. After making substantially a complete loop the tube is bent upwardly to form a second loop of substantially the same diameter positioned above the first loop so as to surround the upper portion of the oil pump housing just below the surface of the oil. At 153 the tube is bent outwardly to permit the formation of a third complete loop at the same level as the second loop, but closely adjacent the inner surface of the discharge manifold 56. At 152 the tube is bent vertically downward to form a straight shank passing through a packing gland in the bottom cover 23 and terminating at an outlet end 154.

The number of loops or convolutions of the finned tube 150 may vary depending upon the diameter of the tube and the dimensions of the bottom cover 23, but I have found that the proportional relationship shown and described is sufficient in ordinary instances. It is to be noted that the hottest water is in heat transferring relationship with the hottest oil, which is the oil adjacent the inner wall of the discharge manifold 56, and adjacent the surface of the pool of oil, which oil is being continuously supplemented by hot oil returned principally through the relief passage 98. The coldest water is in heat-transferring relationship with the colder oil which has previously been cooled by passing through the two upper coils of finned tubing, thereby taking advantage of the counter-flow principle of heat transfer.

A new feature of the compressing unit is the provision in the bottom cover of a plurality of discharge openings in the bottom cover 23. It will be observed that openings 55, 160, 161, 162 and 163 form one group of openings which are spaced 72° apart while openings 160, 164 and 165 form a second group of openings which are spaced 120° apart. It is thus possible to use the same bottom cover for either a three-cylinder or five-cylinder compressing unit. If a three-cylinder unit is being used, there will be three discharge passages 54 spaced 120° apart in position to register with openings 160, 164 and 165; whereas if a five-cylinder compressing unit is being used, there will be five discharge passages 54 in position to register with openings 55, 160, 161, 162 and 163. In the first case, openings 55, 161, 162 and 163 will be blocked by the gasket 27 and the solid lower end of the shell 21, while in the latter case the openings 164 and 165 will be blocked by the gasket 27 and the solid lower end of the shell 21. It is thus possible to reduce inventory and simplify the manufacturing and servicing of various sizes of compressing units since the one bottom cover 23, having the water cooling tube 150 and oil pump 72 assembled therein, will suffice for both sizes of compressing units, and the one gasket 27 will suffice for both sizes of compressing units.

An elbow 170 is shown as providing a connection with the interior of the discharge manifold 56, which elbow provides a connection for a tube (not shown) leading to suitable control equipment.

Having described the preferred embodiments of my invention, it should be apparent to those skilled in the art that modifications in arrangement and details thereof may be achieved, and all such modifications as come within the scope of the following claims are considered to be a part of my invention.

I claim:

1. In a compressing unit having a casing comprising a substantially cylindrical shell and a bottom portion forming an oil sump, a motor and a compressor driven by said motor mounted and hermetically sealed within said casing the improvement comprising an oil circulating cooling system including a pump driven by said motor and mounted within said bottom portion, said pump being normally submerged beneath the level of the oil in said oil sump, said casing having passages therein for conveying oil from said pump to proximity with said motor and other passages communicating with the first-mentioned passages for conveying the oil heated by said motor away from proximity with said motor and into said oil sump, said passages being entirely disposed within the confines of said shell and bottom portion whereby to form a completely hermetically-sealed, oil circulating system, and an oil cooling device comprising a tube having its ends extending through said casing and comprising a section disposed within said oil sump in the space surrounding said pump and beneath the normal level of the oil in said oil sump for the purpose of conveying a stream of water into heat transferring relationship with the oil.

2. In a compressing unit having a casing comprising a substantially cylindrical shell and a bottom portion forming an oil sump, a motor and a compressor driven by said motor mounted and hermetically sealed within said casing the improvement comprising an oil circulating cooling system including a pump driven by said motor and mounted within said bottom portion, said pump being normally submerged beneath the level of the oil in said oil sump, said casing having passages therein for conveying oil from said pump to proximity with said motor and other passages communicating with the first-mentioned passages for conveying the oil heated by said motor away from proximity with said motor and into said oil sump, said passages being entirely disposed within the confines of said shell and bottom portion whereby to form a completely hermetically-sealed, oil circulating system, and an oil cooling device comprising a tube having its ends extending through said bottom portion and comprising a finned section coiled about said pump within said oil sump and beneath the normal level of the oil in said oil sump for the purpose of conveying a stream of water into heat transferring relationship with the oil.

3. In a compressing unit having a casing comprising a substantially cylindrical shell and a bottom cover forming an oil sump, a motor and a compressor driven by said motor mounted and hermetically sealed within said casing the improvement comprising an oil circulating cooling system including a pump driven by said motor and mounted within said bottom cover, said pump being normally submerged beneath the level of the oil in said oil sump, said casing having passages therein for conveying oil from said pump to proximity with said motor and other passages communicating with the first-mentioned passages for conveying the oil heated by said motor away from proximity with said motor and into said oil sump, said passages being entirely disposed within the confines of said shell and bottom cover whereby to form a completely hermetically-sealed, oil circulating system, and an oil cooling device comprising a tube having its ends extending through the bottom of said bottom cover and comprising a finned section coiled about said pump within said oil sump and beneath the normal level of the oil in said oil sump for the purpose of conveying a stream of water into heat transferring relationship with the oil, said tube comprising a plurality of convolutions at different levels in said oil sump with the inlet and outlet thereto being so arranged that the coldest oil is in contact with the coldest water in said tube.

4. In a compressing unit having a casing comprising a substantially cylindrical shell and a bottom cover forming an oil sump, a motor and a compressor driven by said motor mounted and hermetically sealed within said casing the improvement comprising an oil circulating cooling system including a pump driven by said motor and mounted within said bottom cover, said pump being normally submerged beneath the level of the oil in said oil sump, said casing having passages therein for conveying oil from said pump to proximity with said motor and other passages communicating with the first-mentioned passages for conveying the oil heated by said motor away from proximity with said motor and into said oil sump, said passages being entirely disposed within the confines of said shell and bottom cover whereby to form a completely hermetically-sealed, oil circulating system, and an oil cooling device comprising a tube having its ends extending through the bottom of said bottom cover and comprising a finned section coiled about said pump within said oil sump and beneath the normal level of the oil in said oil sump for the purpose of conveying a stream of water into heat transferring relationship with the oil, said tube comprising a plurality of convolutions at different levels in said oil sump with the inlet and outlet thereto being so arranged that the coldest oil is in contact with the coldest water in said tube, said other passages terminating at an outlet closely adjacent the upper surface and outer edge of the oil in said oil sump, and the convolutions of said tube being so arranged that water previously heated by some of the oil in said oil sump passes through a convolution arranged adjacent to the upper and outer edge of the oil in said oil sump whereby to be in heat transferring relationship with the hottest oil therein.

5. A compressing unit comprising a hermetically-sealed casing including a shell, a bottom cover bolted thereto and a gasket interposed between the lower end of said shell and the adjacent surface of said bottom cover, a motor and a compressor driven by said motor mounted and hermetically sealed within said casing, said compressor comprising a plurality of radially extending pistons and said shell comprising radially extending discharge pockets into each of which compressed fluid may be discharged by one of said pistons, said shell having a plurality of longitudinally extending discharge passages therein, each of which extends from the lower end of said shell into one of said discharge pockets, said bottom cover comprising a circumferentially disposed discharge manifold having a plurality of discharge openings each communicating with the interior of said discharge manifold and extending to the surface of said bottom cover adjacent the lower end of said casing, said discharge openings being greater in number than the number of pistons, and comprising at least two groups, each of said discharge passages registering with a discharge opening of one of said groups and said gasket and the solid portions of the lower end of said casing providing means to close the discharge openings of the other of said groups whereby the same bottom cover and gasket may be used with a compressor having one number of cylinders or with a compressor having a greater number of cylinders.

HOMER C. SIMONS.